(12) United States Patent
Shannon et al.

(10) Patent No.: US 7,711,901 B2
(45) Date of Patent: May 4, 2010

(54) METHOD, SYSTEM, AND APPARATUS FOR AN HIERARCHICAL CACHE LINE REPLACEMENT

(75) Inventors: Christopher J. Shannon, Hillsboro, OR (US); Ganapati Srinivasa, Portland, OR (US); Mark Rowland, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1239 days.

(21) Appl. No.: 10/779,204

(22) Filed: Feb. 13, 2004

(65) Prior Publication Data

US 2004/0260880 A1      Dec. 23, 2004

(51) Int. Cl.
   G06F 12/00     (2006.01)
   G06F 13/00     (2006.01)
   G06F 13/28     (2006.01)

(52) U.S. Cl. .................................... 711/133; 711/122
(58) Field of Classification Search ................. 711/122, 711/136, 134, 133
See application file for complete search history.

(56) References Cited

U.S. PATENT DOCUMENTS

| | | | | |
|---|---|---|---|---|
| 5,584,013 A * | 12/1996 | Cheong et al. | ............... | 711/122 |
| 6,574,710 B1 * | 6/2003 | Gaither et al. | ............... | 711/122 |
| 6,643,741 B1 * | 11/2003 | Shuf et al. | .................. | 711/135 |
| 6,912,624 B2 * | 6/2005 | Barroso et al. | ............... | 711/141 |
| 2004/0039880 A1 * | 2/2004 | Pentkovski et al. | .......... | 711/146 |

FOREIGN PATENT DOCUMENTS

GB     EP 0 396 940 A2 *  11/1990

* cited by examiner

*Primary Examiner*—Sheng-Jen Tsai
(74) *Attorney, Agent, or Firm*—Caven & Aghevli LLC (57) ABSTRACT

A cache line replacement protocol for selecting a cache line for replacement based at least in part on the inter-cache traffic generated as a result of the cache line being replaced.

20 Claims, 7 Drawing Sheets

Rev. 16, 5/02

| State0/#cores | State1/#cores | Victim | State0/#cores | State1/#cores | Victim | State0/#cores | State1/#cores | Victim | State0/#cores | State1/#cores | Victim |
|---|---|---|---|---|---|---|---|---|---|---|---|
| M/1 | M/1 | 0 | S/1 | M/1 | 0 | ES/1 | M/1 | 0 | MS/1 | M/1 | 0 |
| M/1 | E/1 | 1 | S/1 | E/1 | 0 | ES/1 | E/1 | 0 | MS/1 | E/1 | 1 |
| M/1 | S/1 | 1 | S/1 | S/1 | 0 | ES/1 | S/1 | 0 | MS/1 | S/1 | 1 |
| M/1 | S/2 | 1 | S/1 | S/2 | 0 | ES/1 | S/2 | 0 | MS/1 | S/2 | 1 |
| M/1 | I/0 | 1 | S/1 | I/0 | 1 | ES/1 | I/0 | 1 | MS/1 | I/0 | 1 |
| M/1 | MI/0 | 1 | S/1 | MI/0 | 0 | ES/1 | MI/0 | 0 | MS/1 | MI/0 | 1 |
| M/1 | MS/1 | 1 | S/1 | MS/1 | 0 | ES/1 | MS/1 | 0 | MS/1 | MS/1 | 0 |
| M/1 | MS/2 | 1 | S/1 | MS/2 | 0 | ES/1 | MS/2 | 0 | MS/1 | MS/2 | 0 |
| M/1 | ES/1 | 1 | S/1 | ES/1 | 0 | ES/1 | ES/1 | 0 | MS/1 | ES/1 | 1 |
| M/1 | ES/2 | 1 | S/1 | ES/2 | 0 | ES/1 | ES/2 | 0 | MS/1 | ES/2 | 1 |
| E/1 | M/1 | 0 | S/2 | M/1 | 0 | ES/2 | M/1 | 0 | MS/2 | M/1 | 0 |
| E/1 | E/1 | 0 | S/2 | E/1 | 0 | ES/2 | E/1 | 0 | MS/2 | E/1 | 1 |
| E/1 | S/1 | 1 | S/2 | S/1 | 1 | ES/2 | S/1 | 1 | MS/2 | S/1 | 1 |
| E/1 | S/2 | 1 | S/2 | S/2 | 0 | ES/2 | S/2 | 0 | MS/2 | S/2 | 1 |
| E/1 | I/0 | 1 | S/2 | I/0 | 1 | ES/2 | I/0 | 1 | MS/2 | I/0 | 1 |
| E/1 | MI/0 | 0 | S/2 | MI/0 | 0 | ES/2 | MI/0 | 0 | MS/2 | MI/0 | 1 |
| E/1 | MS/1 | 0 | S/2 | MS/1 | 0 | ES/2 | MS/1 | 0 | MS/2 | MS/1 | 1 |
| E/1 | MS/2 | 0 | S/2 | MS/2 | 0 | ES/2 | MS/2 | 0 | MS/2 | MS/2 | 0 |
| E/1 | ES/1 | 1 | S/2 | ES/1 | 1 | ES/2 | ES/1 | 1 | MS/2 | ES/1 | 1 |
| E/1 | ES/2 | 1 | S/2 | ES/2 | 0 | ES/2 | ES/2 | 0 | MS/2 | ES/2 | 1 |
| I/0 | M/1 | 0 | I/0 | MI/0 | 0 | MI/0 | M/1 | 0 | MI/0 | MI/0 | 0 |
| I/0 | E/1 | 0 | I/0 | MS/1 | 0 | MI/0 | E/1 | 1 | MI/0 | MS/1 | 0 |
| I/0 | S/1 | 0 | I/0 | MS/2 | 0 | MI/0 | S/1 | 1 | MI/0 | MS/2 | 0 |
| I/0 | S/2 | 0 | I/0 | ES/1 | 0 | MI/0 | S/2 | 1 | MI/0 | ES/1 | 1 |
| I/0 | I/0 | 0 | I/0 | ES/2 | 0 | MI/0 | I/0 | 1 | MI/0 | ES/2 | 1 |

FIGURE 1

| | 202 | 204 | 206 |
|---|---|---|---|
| | State | Possible Inter-Cache Traffic | Cost |
| | M | Invalidate, writeback | 4 |
| | E | Invalidate, possible writeback | 2 |
| | S | Invalidate | 1 |
| | I | None | 0 |
| | MI | Writeback | 3 |
| | MS | Invalidate, writeback | 4 |
| | ES | Invalidate | 1 |

Rev. 16, 5/02

FIGURE 2

| 302 | 304 |
|---|---|
| 4 Way LRU | Victims |
| 000 | 0,2 |
| 001 | 0,3 |
| 010 | 1,2 |
| 011 | 1,3 |
| 100 | 2,0 |
| 101 | 3,0 |
| 110 | 2,1 |
| 111 | 3,1 |

FIGURE 3

| State0 | State1 | Victim | State0 | State1 | Victim | State0 | State1 | Victim | State0 | State1 | Victim |
|---|---|---|---|---|---|---|---|---|---|---|---|
| M | M | 0 | S | M | 0 | ES | M | 0 | MS | M | 0 |
| M | E | 1 | S | E | 0 | ES | E | 0 | MS | E | 1 |
| M | S | 1 | S | S | 0 | ES | S | 0 | MS | S | 1 |
| M | I | 1 | S | I | 1 | ES | I | 1 | MS | I | 1 |
| M | MI | 0 | S | MI | 0 | ES | MI | 0 | MS | MI | 1 |
| M | MS | 0 | S | MS | 0 | ES | MS | 0 | MS | MS | 0 |
| M | ES | 1 | S | ES | 0 | ES | ES | 0 | MS | ES | 1 |
| E | M | 1 | I | M | 0 | MI | M | 0 |  |  |  |
| E | E | 0 | I | E | 1 | MI | E | 1 |  |  |  |
| E | S | 1 | I | S | 1 | MI | S | 1 |  |  |  |
| E | I | 1 | I | I | 0 | MI | I | 0 |  |  |  |
| E | MI | 0 | I | MI | 0 | MI | MS | 0 |  |  |  |
| E | MS | 0 | I | MS | 0 | MI | ES | 1 |  |  |  |

| State | # of cores with data | Possible Inter-Cache Traffic | Cost |
|---|---|---|---|
| M | 1 | Invalidate (possible HitM), writeback | 7 |
| E | 1 | Invalidate (possible HitM), possible writeback | 3 |
| S | 1 | Invalidate | 1 |
| S | 2 | Invalidate, invalidate | 2 |
| I | 0 | None | 0 |
| MI | 0 | Writeback | 4 |
| MS | 1 | Invalidate, writeback | 5 |
| MS | 2 | Invalidate, invalidate, writeback | 6 |
| ES | 1 | Invalidate | 1 |
| ES | 2 | Invalidate, invalidate | 2 |

Rev. 16, 5/02

FIGURE 6

| 4 Way LRU | Victims |
|---|---|
| 000 | 0,2 |
| 001 | 0,3 |
| 010 | 1,2 |
| 011 | 1,3 |
| 100 | 2,0 |
| 101 | 3,0 |
| 110 | 2,1 |
| 111 | 3,1 |

FIGURE 7

Rev. 16. 5/02

| State0/#cores | State1/#cores | Victim | State0/#cores | State1/#cores | Victim | State0/#cores | State1/#cores | Victim | State0/#cores | State1/#cores | Victim |
|---|---|---|---|---|---|---|---|---|---|---|---|
| M/1 | M/1 | 0 | S/1 | M/1 | 0 | ES/1 | M/1 | 0 | MS/1 | M/1 | 0 |
| M/1 | E/1 | 1 | S/1 | E/1 | 0 | ES/1 | E/1 | 0 | MS/1 | E/1 | 1 |
| M/1 | S/1 | 1 | S/1 | S/1 | 0 | ES/1 | S/1 | 0 | MS/1 | S/1 | 1 |
| M/1 | S/2 | 1 | S/1 | S/2 | 0 | ES/1 | S/2 | 0 | MS/1 | S/2 | 1 |
| M/1 | I/0 | 1 | S/1 | I/0 | 1 | ES/1 | I/0 | 1 | MS/1 | I/0 | 1 |
| M/1 | MI/0 | 1 | S/1 | MI/0 | 0 | ES/1 | MI/0 | 0 | MS/1 | MI/0 | 1 |
| M/1 | MS/1 | 1 | S/1 | MS/1 | 0 | ES/1 | MS/1 | 0 | MS/1 | MS/1 | 1 |
| M/1 | MS/2 | 1 | S/1 | MS/2 | 0 | ES/1 | MS/2 | 0 | MS/1 | MS/2 | 1 |
| M/1 | ES/1 | 1 | S/1 | ES/1 | 0 | ES/1 | ES/1 | 0 | MS/1 | ES/1 | 1 |
| M/1 | ES/2 | 1 | S/1 | ES/2 | 0 | ES/1 | ES/2 | 0 | MS/1 | ES/2 | 1 |
| E/1 | M/1 | 0 | S/2 | M/1 | 0 | ES/2 | M/1 | 0 | MS/2 | M/1 | 0 |
| E/1 | E/1 | 0 | S/2 | E/1 | 0 | ES/2 | E/1 | 0 | MS/2 | E/1 | 1 |
| E/1 | S/1 | 1 | S/2 | S/1 | 1 | ES/2 | S/1 | 1 | MS/2 | S/1 | 1 |
| E/1 | S/2 | 1 | S/2 | S/2 | 0 | ES/2 | S/2 | 0 | MS/2 | S/2 | 1 |
| E/1 | I/0 | 1 | S/2 | I/0 | 1 | ES/2 | I/0 | 1 | MS/2 | I/0 | 1 |
| E/1 | MI/0 | 0 | S/2 | MI/0 | 0 | ES/2 | MI/0 | 1 | MS/2 | MI/0 | 1 |
| E/1 | MS/1 | 0 | S/2 | MS/1 | 0 | ES/2 | MS/1 | 1 | MS/2 | MS/1 | 1 |
| E/1 | MS/2 | 0 | S/2 | MS/2 | 0 | ES/2 | MS/2 | 0 | MS/2 | MS/2 | 0 |
| E/1 | ES/1 | 1 | S/2 | ES/1 | 1 | ES/2 | ES/1 | 1 | MS/2 | ES/1 | 1 |
| E/1 | ES/2 | 1 | S/2 | ES/2 | 0 | ES/2 | ES/2 | 0 | MS/2 | ES/2 | 0 |
| I/0 | M/1 | 0 | I/0 | M/1 | 0 | MI/0 | M/1 | 0 | MI/0 | M/1 | 0 |
| I/0 | E/1 | 0 | I/0 | E/1 | 0 | MI/0 | E/1 | 0 | MI/0 | E/1 | 0 |
| I/0 | S/1 | 0 | I/0 | S/1 | 0 | MI/0 | S/1 | 0 | MI/0 | S/1 | 0 |
| I/0 | S/2 | 0 | I/0 | S/2 | 0 | MI/0 | S/2 | 0 | MI/0 | S/2 | 0 |
| I/0 | I/0 | 0 | I/0 | I/0 | 0 | MI/0 | I/0 | 1 | MI/0 | ES/2 | 1 |

METHOD, SYSTEM, AND APPARATUS FOR AN HIERARCHICAL CACHE LINE REPLACEMENT

FIELD OF INVENTION

The present disclosure is related to cache memory, such as for a cache line replacement scheme.

BACKGROUND

As is well-known, a cache stores information for a computer or computing system in order to decrease data retrieval times for a processor. Some examples of computing systems are a personal digital assistant, internet tablet, and a cellular phone. The cache stores specific subsets of information in high-speed memory. A few examples of information are instructions, addresses, and data. When a processor requests a piece of information, the system checks the cache first to see if the information is stored within the cache. If so, the processor can retrieve the information much faster than if the data was stored in other computer readable media, such as, random access memory, a hard drive, compact disc read-only memory (CD ROM), or a floppy disk.

Cache memories have a range of different architectures with respect to addresses locations mapped to predetermined cache locations. For example, cache memories may be direct mapped or fully associative. Alternatively, another cache memory is a set associative cache, which is a compromise between a direct mapped cache and fully associative cache. In a direct mapped cache, there is one address location in each set. Conversely, a fully associative cache that is N-way associative has a total number of N blocks in the cache. Finally, a set associative cache, commonly referred to as N-way set associative, divides the cache into a plurality of N ways wherein each address is searched associatively for a tag.

Efficient cache operation utilizes cache management techniques for replacing cache locations in the event of a cache miss. In a typical cache miss, the address and data fetched from the system or main memory is stored in cache memory. However, the cache needs to determine which cache location is to be replaced by the new address and data from system memory. One technique for replacing cache locations is implementing a protocol with least recently used (LRU) bits. Least recently used bits are stored for each cache location and are updated when the cache location is accessed or replaced. Valid bits determine the coherency status of the respective cache location. Therefore, based on the value of the least recently used bits and the valid bits, the cache effectively replaces the cache locations where the least recently used bits indicate the line is the least recently used or the line is not valid. There is a variety of replacement protocols utilized by cache memory, such as, pseudo-LRU, random, and not recently used (NRU) protocols. However, the present replacement protocols may result in increased inter-cache traffic. For example, replacing a line from an inclusive last level cache requires the same line to be evicted from all the lower level caches. Therefore, this results in increased inter-cache traffic.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

FIG. 8 is a table of the expected victim for each combination of potential cache line candidates for replacement as utilized by a second embodiment.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Figure 1:
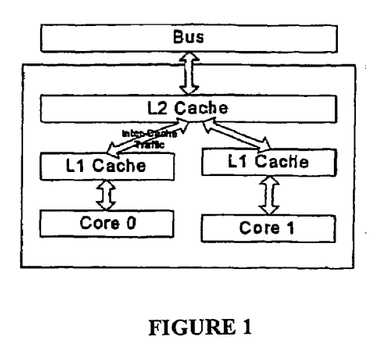
FIG. 1 is a diagram illustrating inter-cache traffic.

An area of current technological development relates to improving the speed and efficiency of cache memory replacement protocols. As previously described, the present replacement protocols may result in increased inter-cache traffic. For example, replacing a line from an inclusive last level cache requires the same line to be evicted from all the lower level caches. Therefore, this results in increased inter-cache traffic. For example, FIG. 1 depicts inter-cache traffic between a Level 2 (L2) and Level 1 (L1) cache.

In contrast, the claimed subject matter facilitates a replacement protocol for selecting a victim line for replacement based at least in part on the potential inter-cache traffic associated with that particular victim line. Therefore, selecting a victim line based on the inter-cache traffic allows for efficient cache line replacement and/or decreasing the contention on the caches and various levels of the caches which results in more efficient bus utilization. In one embodiment, the replacement protocol is a four-way pseudo least recently used (LRU) replacement protocol and supports the MESI (modified Exclusive Shared Invalidate). In another embodiment, the replacement protocol is a four-way pseudo least recently used (LRU) replacement protocol and supports the MESI (modified Exclusive Shared Invalidate) and additional cache states such as MI, MS, and ES. The additional cache states, MI, MS, and ES facilitate snoop filtering. To explain these states, one interprets the cache states from a system perspective, the first letter stands for state of the line in the last level cache, in contrast, the second letter stands for line in the next lower level cache. As previously described, the same definitions apply for M, E, S, and I. For example, a cache line with a MI state is interpreted as having a modified state for the line in the last level cache, while having a invalidate statues for the line in the next lower level cache.

Figure 9:
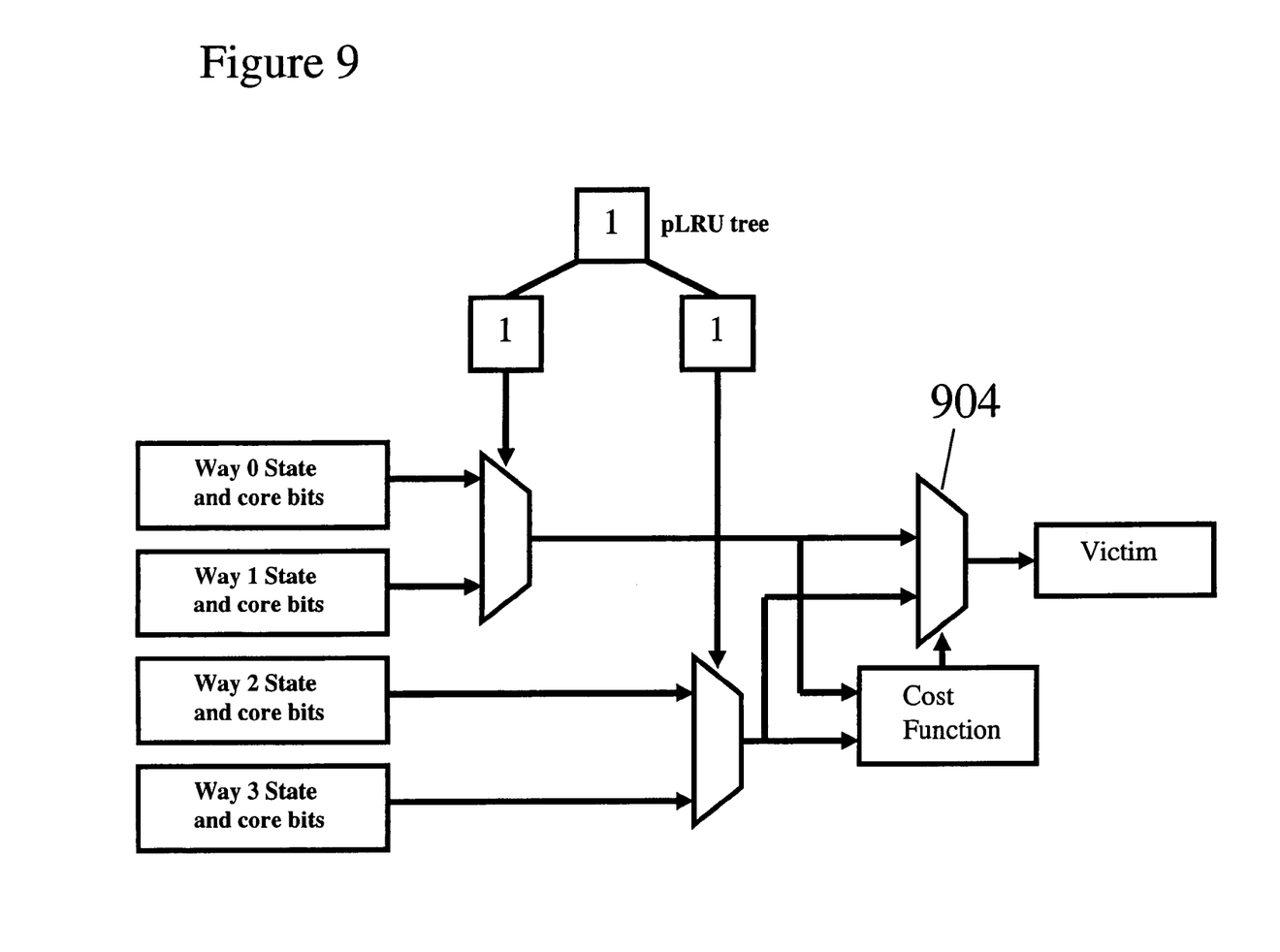
FIG. 9 is a schematic as utilized by a second embodiment.
Figure 10:
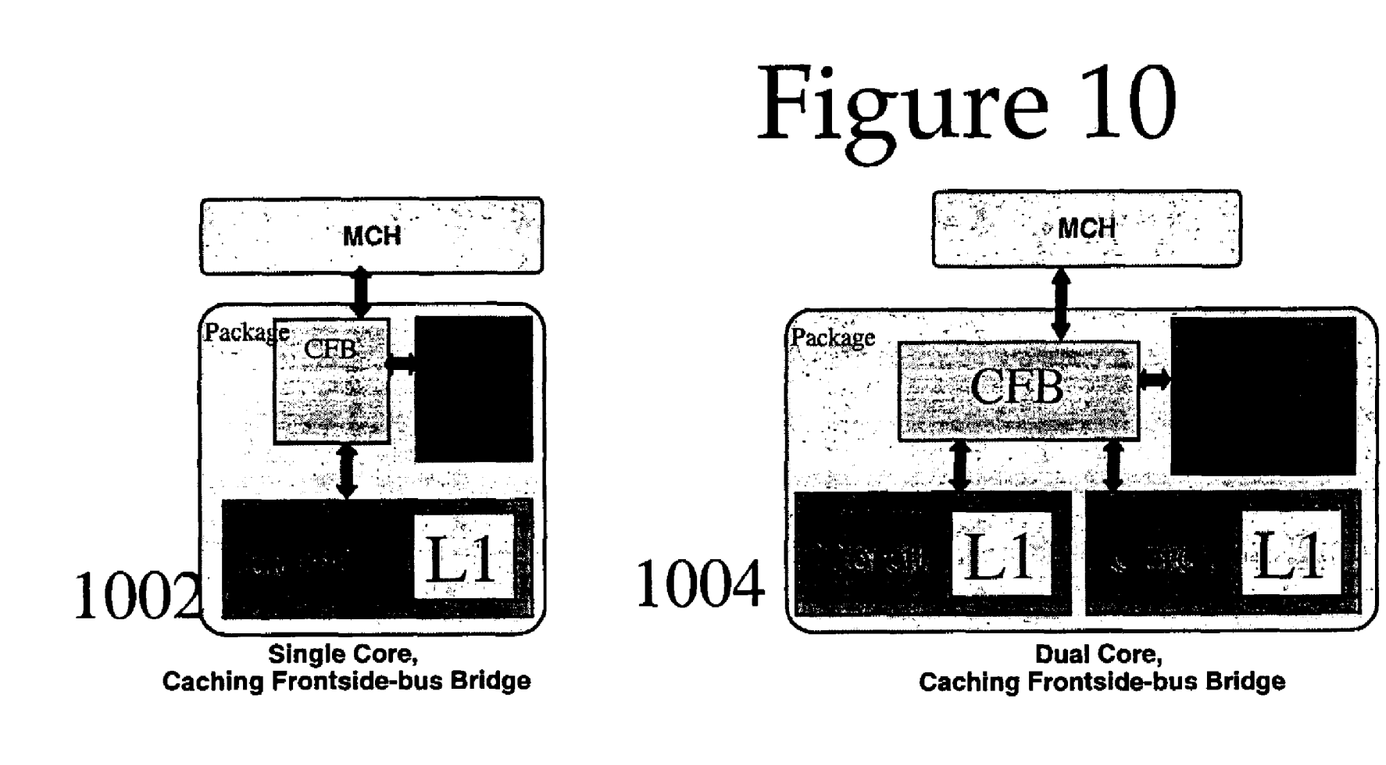
FIG. 10 is a system as utilized by multiple embodiments.

The claimed subject matter facilitates a LRU protocol to support a single core processor, as depicted in connection with FIGS. 2-5, and to support a multi-core processor, as depicted in connection with FIGS. 6-9, and a system that utilizes either a single or multi-core processor, or both, as depicted in connection with FIG. 10.

Figure 2:
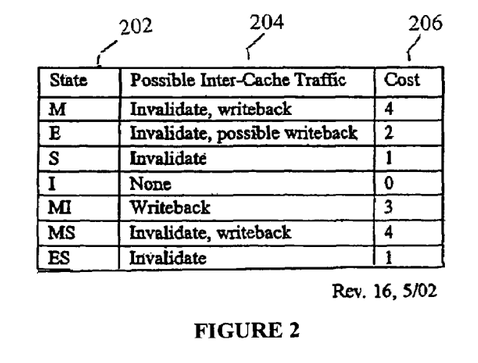
FIG. 2 is a table of a state of a cache line versus cost of traffic as utilized by a first embodiment.

FIG. 2 is a table of a state of a cache line versus cost of traffic as utilized by an embodiment. The table depicts possible values of cache states (202), the inter-cache traffic (204), and the relative cost of evicting a cache line with the particular cache state (206). Evicting a cache line may result in different amounts of inter-cache traffic. For example, evicting a cache line in a level two (L2 cache) with a modified state (M state) utilizes two additional transactions: first, an invalidate for removing the line from all lower level caches and second, a writeback to main memory for recording the modified data.

In contrast, evicting a cache line in an Invalidate state (I state) does not cause any additional traffic because there is no need to remove this line from any other caches. Therefore, a cost of zero is assigned to this cache state in the table.

Figure 3:
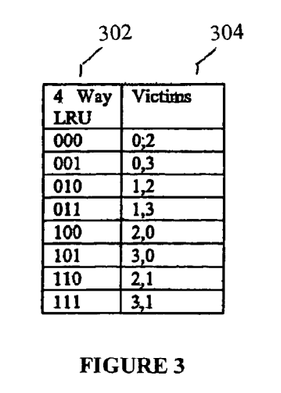
FIG. 3 is a table of the next two victims for a plurality of LRU states of a cache line as utilized by a first embodiment.

FIG. 3 is a table of the candidates for the next two victims for a plurality of LRU states of a cache line as utilized by an embodiment. In this embodiment, a four way pseudo LRU replacement protocol is utilized with three bits for each set (as depicted in column 302). For example, each bit is a node in a binary tree that points to the next victim. Consequently, all paths leading to the chosen way are inverted for pointing to the next victim to the other side of the tree. Therefore, in one aspect, the table depicts the next two victims for each possible LRU state (as depicted in column 304).

Figure 4:
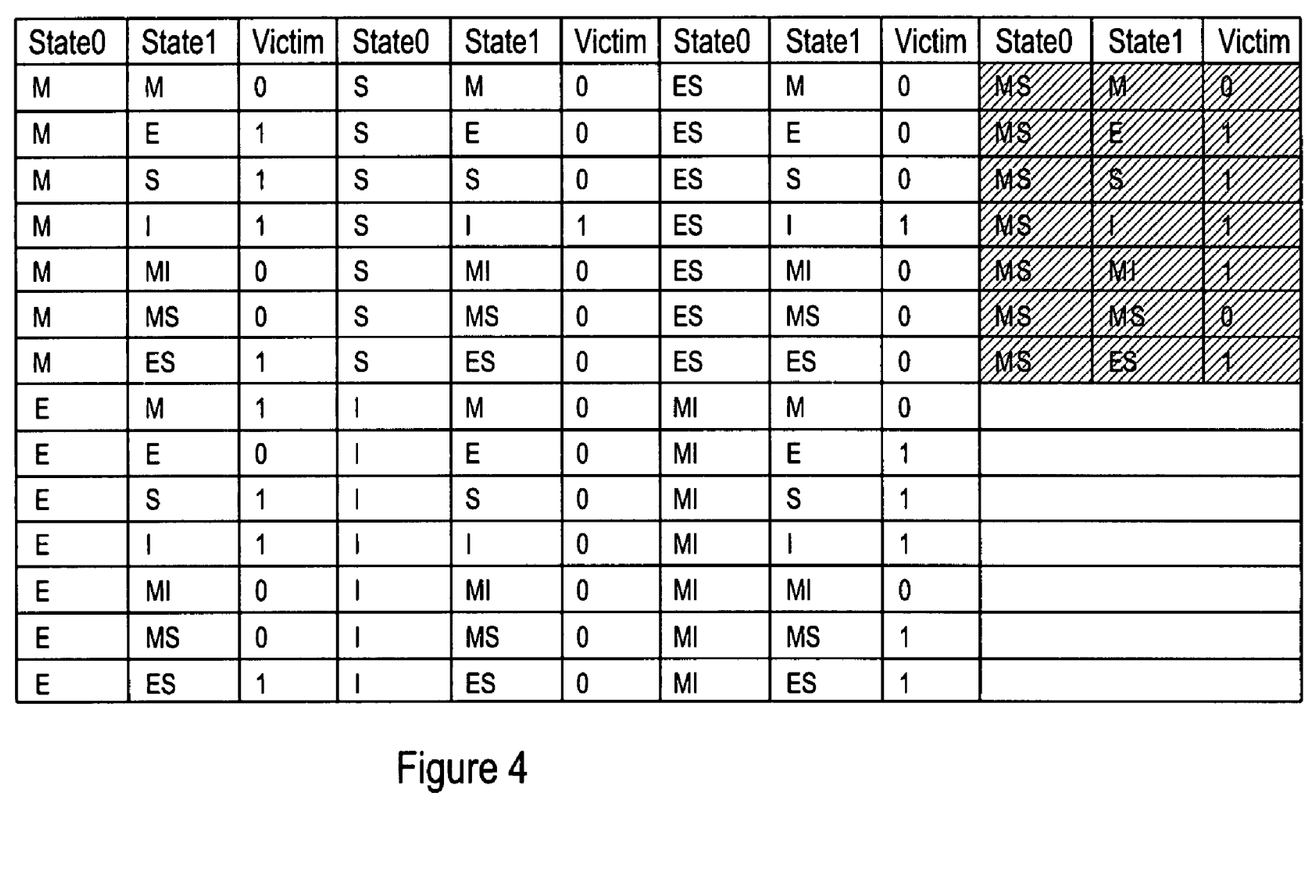
FIG. 4 is a table of the expected victim for each combination of potential cache line candidates for replacement as utilized by a first embodiment.

FIG. 4 is a table of the expected victim for each combination of potential cache line candidates for replacement as utilized by an embodiment. As previously described, the table in connection with FIG. 3 depicted the way candidates for possible replacement. FIG. 4 utilizes this information by depicting every combination of states for the two possible candidates and selecting one of the candidates based at least in part on the inter-cache traffic. For example, each possible state for the two candidates is depicted in each column of State 1 and State 2. In contrast, the victim column depicts which one of the two candidates will be replaced. In one embodiment, the first candidate (state 1) will be replaced when the victim value is a zero. In contrast, the second candidate (state 2) will be replaced when the victim value is a one.

Therefore, the victim is chosen based on the two possible candidates depicted in connection with FIG. 3 while considering the cost function depicted in connection with FIG. 2. For example, let us analyze the first set of candidates in the second line of the table. The candidate for state 1 has a modified state while the candidate for state 2 has an exclusive state, The cost function analysis from FIG. 2 is applied. Consequently, the second candidate is chosen since it generates less inter-cache traffic (2 versus 4 for relative cost for E vs. M).

Figure 5:
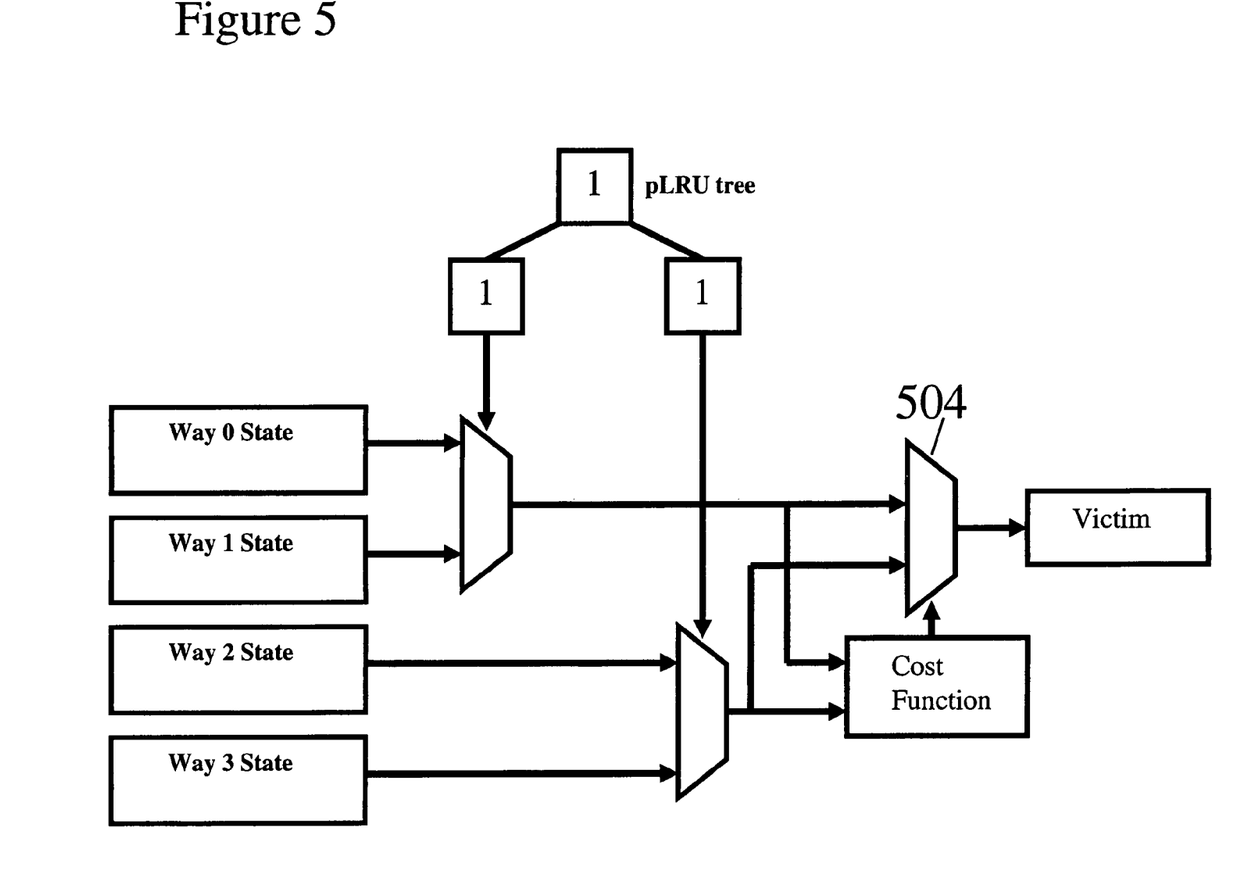
FIG. 5 is a schematic as utilized by a first embodiment.

FIG. 5 is a schematic as utilized by an embodiment. In one aspect, the schematic depicts the logic associated with the analysis described in connection with FIG. 4 for selecting one of the two candidates for replacement. As previously described, the state of each way is analyzed and the cost function (depicted in connection with FIG. 2) selects the victim for replacement at multiplexer 504.

Figure 6:
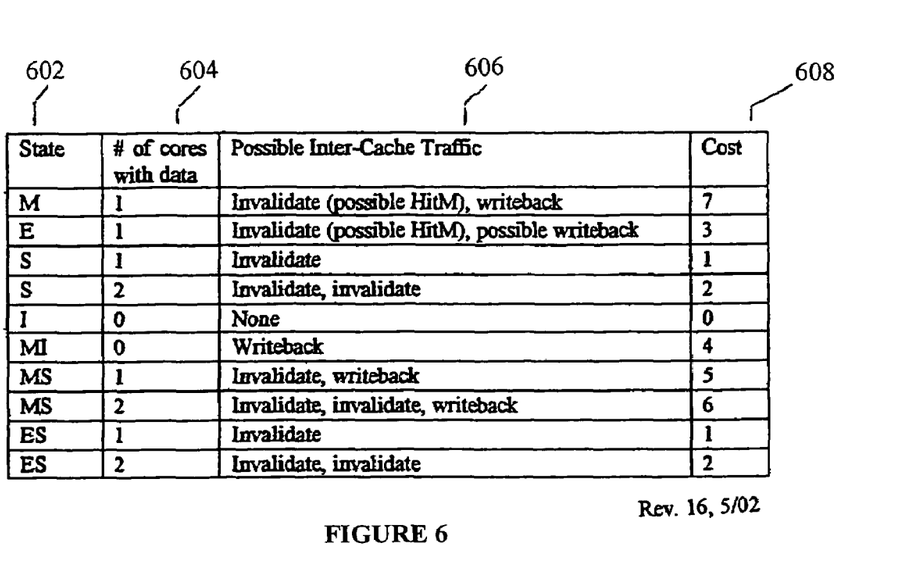
FIG. 6 is a table of a state of a cache line versus cost of traffic as utilized by a second embodiment.

FIG. 6 is a table of a state of a cache line versus cost of traffic as utilized by an embodiment. In this embodiment, FIG. 6 supports a multi-core processor or a system with a multi-core processor. The table depicts possible values of cache states (602), the number of cores with the data (604), the inter-cache traffic (606), and the relative cost of evicting a cache line with the particular cache state (608). Evicting a cache line may result in different amounts of inter-cache traffic. For example, evicting a cache line in a level two (L2 cache) with a modified state (M state) for one core utilizes two additional transactions: first, an invalidate for removing the line from all lower level caches and second, a writeback to main memory for recording the modified data. Consequently, it has a high relative cost of seven associated with this state.

In contrast, evicting a cache line in an Invalidate state (I state) does not cause any additional traffic because there is no need to remove this line from any other caches. Therefore, a cost of zero is assigned to this cache state in the table.

Figure 7:
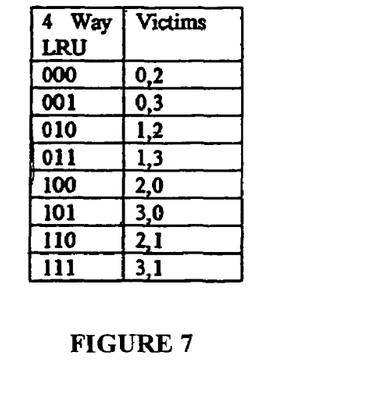
FIG. 7 is a table of the next two victims for a plurality of LRU states of a cache line as utilized by a second embodiment.

FIG. 7 is a table of the candidates for the next two victims for a plurality of LRU states of a cache line as utilized by an embodiment. In this embodiment, a four way pseudo LRU replacement protocol is utilized with three bits for each set (as depicted in column 302). For example, each bit is a node in a binary tree that points to the next victim. Consequently, all paths leading to the chosen way are inverted for pointing to the next victim to the other side of the tree. Therefore, in one aspect, the table depicts the next two victims for each possible LRU state (as depicted in column 304).

FIG. 8 is a table of the expected victim for each combination of potential cache line candidates for replacement as utilized by an embodiment. As previously described, the table in connection with FIG. 7 depicted the way candidates for possible replacement. FIG. 8 utilizes this information by depicting every combination of states for the two possible candidates and selecting one of the candidates based at least in part on the inter-cache traffic. For example, each possible state for the two candidates is depicted in each column of State 1/#cores and State 2/#cores (and includes the number of cores with the relevant data). In contrast, the victim column depicts which one of the two candidates will be replaced. In one embodiment, the first candidate (state 1) will be replaced when the victim value is a zero. In contrast, the second candidate (state 2) will be replaced when the victim value is a one.

Therefore, the victim is chosen based on the two possible candidates depicted in connection with FIG. 7 while considering the cost function depicted in connection with FIG. 6. For example, let us analyze the first set of candidates in the second line of the table. The candidate for state 1 has a modified state for one corewhile the candidate for state 2 has an exclusive state, The cost function analysis from FIG. 6 is applied. Consequently, the second candidate is chosen since it generates less inter-cache traffic (3 versus 7 for relative cost for E vs. M).

FIG. 9 is a schematic as utilized by an embodiment. In one aspect, the schematic depicts the logic associated with the analysis described in connection with FIG. 8 for selecting one of the two candidates for replacement based on the state of the cache line in the respective way and the value of the core bit. In one embodiment, the core bit is stored with each cache line that indicates whether a lower level cache has a copy of the cache line. In this embodiment, a single core bit is utilized for each core that shares the last level cache. As previously described, the state of each way is analyzed and the cost function (depicted in connection with FIG. 6) selects the victim for replacement at multiplexer 904.

FIG. 10 is a system for multiple embodiments. The multiple embodiments, 1002 and 1004 are intended to represent a range of systems having single or multiple processors, for example, computer systems, real-time monitoring systems, etc. Alternative multiprocessor systems can include more, fewer and/or different components. In certain situations, the cache management techniques described herein can be applied to both single processor and to multiprocessor systems. The bus system, CFB (cacheing frontside bus) can include any number of buses and associated interconnection circuitry, for example, bus bridges. The processors can communicate with a memory controller hub (MCH).

The systems can support any combination of dynamic (e.g., random access memory) and static (e.g., read-only memory, CD-ROM, disk storage, flash memory) memory devices and associated drives, where appropriate. The memory devices are used to store information and instructions to be executed by processor or multiple processors.

Instructions can be provided to the system 1002 or 1004 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A method for replacing a line in a configuration with multiple levels of cache memories, with each cache memory with a plurality of cache ways, each cache way with a plurality of lines, comprising:
    assigning a state for at least one cache line in at least two cache ways;
    assigning a relative cost function for potential inter-cache traffic caused by replacing the cache line, wherein the inter-cache traffic comprises traffic between one level of cache in a processor and another level of cache in the processor, wherein data is to be stored in a cache line based at least in part on the relative cost function assignment; and
    selecting one of two possible victim cache lines for replacement based on the cost function, wherein the two possible victim cache lines are from two different cache levels.

2. The method of claim 1 wherein the plurality of ways is four.

3. The method of claim 1 wherein the state of the cache line is either modified, exclusive, shared, or invalidated.

4. A method for replacing a line in a configuration with multiple levels of cache memories, with each cache memory with a plurality of cache ways, each cache way with a plurality of lines, comprising:
    assigning a state for at least one cache line in at least two cache ways;
    assigning a relative cost function for inter-cache traffic for the state of the cache line associated with replacing the cache line; and
    selecting the cache line for replacement, from two possible victim cache lines, based at least in part on the cost function, wherein the inter-cache traffic comprises traffic between one level of cache in a processor and another level of cache in the processor, wherein the two possible victim cache lines are from two different cache levels.

5. The method of claim 4 wherein the plurality of ways is four.

6. The method of claim 4 wherein the state of the cache line is either modified, exclusive, shared, or invalidated.

7. A method for a cache line replacement protocol for replacing a line in a configuration with multiple levels of cache memories, with each cache memory with a plurality of cache ways, each cache way with a plurality of lines, comprising:
    assigning a state for at least one cache line in at least two cache ways;
    assigning a relative cost function for inter-cache traffic for the state of the cache line associated with replacing the cache line;
    identifying two possible cache lines for replacement, wherein the two possible cache lines are from two different cache levels; and
    selecting one of the two possible cache lines for replacement based at least in part on the cost function, wherein the inter-cache traffic comprises traffic between one level of cache in a processor and another level of cache in the processor.

8. The method of claim 7 wherein the plurality of ways is four.

9. The method of claim 7 wherein the state of the cache line is either modified, exclusive, shared, or invalidated.

10. The method of claim 7 wherein the cache line replacement protocol is a three bit replacement protocol for a four way cache.

11. A system comprising:
    at least one processor;
    a cache, coupled to the processor, with a plurality of cache ways, each of the plurality of cache ways with a plurality of lines; wherein a state is assigned for at least one cache line in at least two cache ways, and
        a relative cost function is for inter-cache traffic is assigned for the state of the cache line associated with replacing the cache line; and
        the cache line is selected for replacement based at least in part on the cost function from two possible victim cache lines, wherein the two possible victim cache lines are from two different cache levels, wherein the inter-cache traffic comprises traffic between one level of cache and another level of cache.

12. The system of claim 11 wherein the processor communicates with a memory controller hub (MCH).

13. The system of claim 11 wherein the plurality of ways is four.

14. The system of claim 11 wherein the state of the cache line is either modified, exclusive, shared, or invalidated.

15. A method for replacing a line in a multi-level cache memory in a multi-core processor with a plurality of cache ways, each cache way with a plurality of lines, comprising:
    assigning a state for at least one cache line in at least two cache ways;
    assigning a core bit for each core that shares a last level cache in the multi-level cache memory;
    assigning a relative cost function for inter-cache traffic for the state of the cache line associated with replacing the cache line, wherein data is to be stored in a cache line based at least in part on the relative cost function assignment, wherein the inter-cache traffic comprises traffic between one level of cache in a core and another level of cache in the core; and selecting one of two possible victim cache lines for replacement based on the cost function, wherein the two possible victim cache lines are from two different cache levels.

16. The method of claim 15 wherein the plurality of ways is four.

17. The method of claim 15 wherein the state of the cache line is either modified, exclusive, shared, or invalidated.

18. A method for replacing a line in a configuration with multiple levels of cache memories, with each cache memory with a plurality of cache ways, each cache way with a plurality of lines, comprising:

assigning a state for at least one cache line in at least two cache ways;

assigning a core bit for each core that shares a last level cache in the multi-level cache memory;

assigning a relative cost function for inter-cache traffic for the state of the cache line associated with replacing the cache line; and selecting the cache line for replacement, from two possible victim cache lines, based at least in part on the cost function, wherein the inter-cache traffic comprises traffic between one level of cache in a core and another level of cache in the core, wherein the two possible victim cache lines are from two different cache levels.

19. The method of claim 18 wherein the plurality of ways is four.

20. The method of claim 18 wherein the state of the cache line is either modified, exclusive, shared, or invalidated.

* * * * *